United States Patent [19]

Mergenthaler et al.

[11] Patent Number: 5,058,961
[45] Date of Patent: Oct. 22, 1991

[54] APPARATUS FOR DAMPING PRESSURE FLUCTUATIONS

[75] Inventors: Robert Mergenthaler, Markgroeningen; Heinz Siegel, Stuttgart, both of Fed. Rep. of Germany

[73] Assignee: Robert Bosch GmbH, Stuttgart, Fed. Rep. of Germany

[21] Appl. No.: 528,983

[22] Filed: May 25, 1990

[30] Foreign Application Priority Data

Jul. 14, 1989 [DE]  Fed. Rep. of Germany ....... 3923282

[51] Int. Cl.⁵ .......................... B60T 8/32; B60T 13/12; B60T 17/02; F15B 1/02
[52] U.S. Cl. ...................... 303/115; 303/68; 303/87; 303/116 R
[58] Field of Search ................. 303/116, 119, 68–69, 303/87, 113, 114, 117, 115; 60/553; 188/181 A, 181 R

[56] References Cited

U.S. PATENT DOCUMENTS

| | | | |
|---|---|---|---|
| 3,532,391 | 10/1970 | Klein | 303/116 X |
| 3,667,816 | 6/1972 | Harned | 303/116 X |
| 4,099,793 | 7/1978 | Iio | 303/68 X |
| 4,179,166 | 12/1979 | Sharp et al. | 303/116 X |
| 4,618,189 | 10/1986 | Nakanishi et al. | 303/116 |
| 4,668,024 | 5/1987 | Nakanishi et al. | 303/69 X |
| 4,703,979 | 11/1987 | Nakanishi et al. | 303/116 |
| 4,812,777 | 3/1989 | Shirai | 303/87 X |
| 4,861,116 | 8/1989 | Bernhardt et al. | 303/116 X |
| 4,962,975 | 10/1990 | Kervagoret | 303/119 X |

FOREIGN PATENT DOCUMENTS

3133111  4/1983  Fed. Rep. of Germany .

*Primary Examiner*—Douglas C. Butler
*Attorney, Agent, or Firm*—Edwin E. Greigg; Ronald E. Greigg

[57] ABSTRACT

The vehicle brake system has a master brake cylinder to generate brake pressure in at least one wheel brake. To avoid wheel locking during braking, a pressure control valve assembly and a pump for drawing pressure fluid out of the wheel brake are disposed between the master brake cylinder and the wheel brake. With its outlet, the pump communicates with the master brake cylinder via a damper chamber and a throttle having a pressure limiting valve disposed to bypass the throttle. The throttle and the pressure limiting valve have a common sleevelike housing, in which a cylindrically embodiment closing element is guided longitudinally movably. This closing element has a hollow collar on its face end that in the closing position fits over an inflow opening for pressure fluid. The collar of the closing element, in order to form the throttle, is provided with at least one aperture open toward this face end. The pressure limiting valve, which responds if the throttle is blocked with particles, overcomes the cross-sectional limitation of the throttle, so that the throttle can be self cleaning.

42 Claims, 2 Drawing Sheets

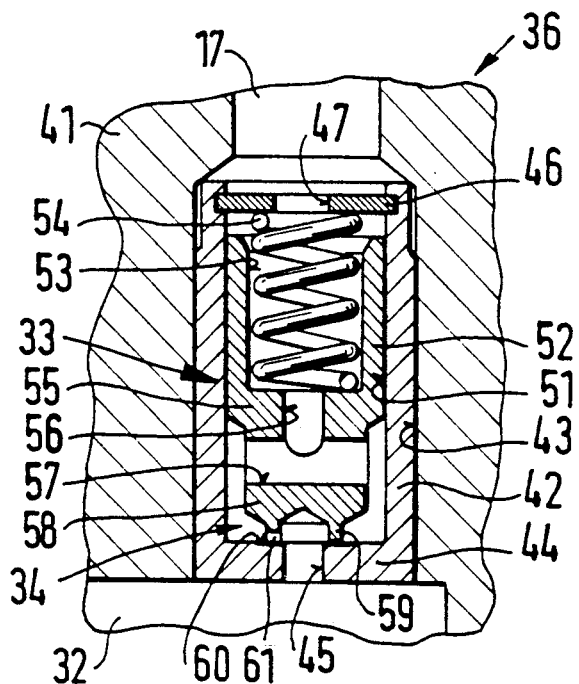
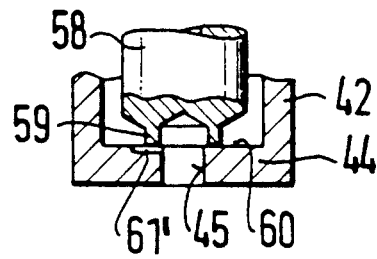
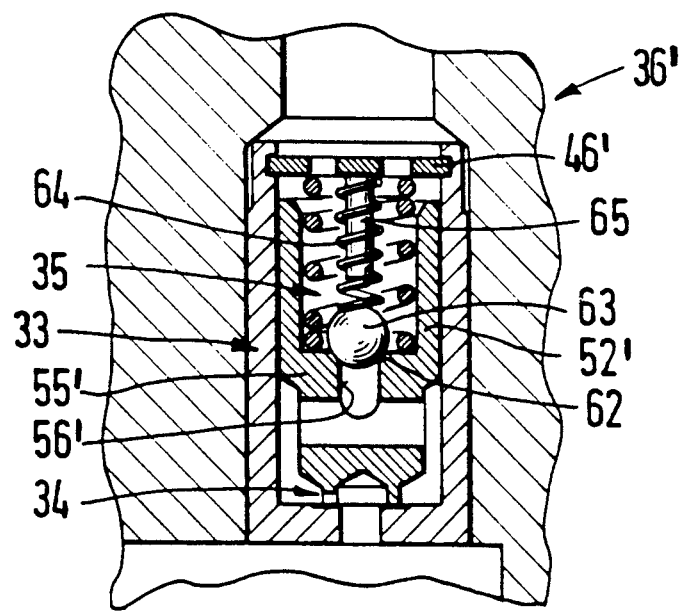

APPARATUS FOR DAMPING PRESSURE FLUCTUATIONS

BACKGROUND OF THE INVENTION

The invention is based on an apparatus for damping pressure fluctuations in a hydraulic vehicle brake system as defined hereinafter. Such an apparatus is already known from German Offenlegungsschrift 31 33 111, in which the pressure fluctuations, engendered by the pump in anti-skid braking operation, are reduced by the action of the damper chamber and throttle, which are matched to one another. As a result, irritating noise development and pulsation of the brake pedal are largely avoided. Since the throttle delays the supply of relatively large quantities of pressure fluid, a pressure limiting valve is disposed parallel to the throttle, and its spring-loaded closing element opens at a predetermined pressure in order to bypass the throttle. The pressure limiting valve also opens whenever particles contained in the pressure fluid close up the throttle. In that case, the damping action of the apparatus is largely neutralized.

OBJECT AND SUMMARY OF THE INVENTION

The apparatus according to the invention has the advantage over the prior art that by structurally connecting the throttle to the closing element of the pressure limiting valve, a functional dependency is also attained that also triggers an enlargement of the throttle cross section and thus flushes out the throttle when the pressure limiting valve comes into action. The function of the pressure fluctuation damping apparatus is preserved as a result. Because of this self-cleaning action, the throttle cross section can be kept quite small, which improves the damping action. Furthermore, there are advantages in terms of production and assembly because of the structural combination of the throttle and the pressure limiting valve.

One of the features disclosed in the application has the advantage that feeding of pressure, generated in the master brake cylinder, thence into the apparatus is avoided in normal braking operation, thereby lessening the elasticity of the brake system and correspondingly shortening brake pedal travel.

With another embodiment also disclosed herein an axially short structure is attained by disposing the check valve inside the pressure limiting valve.

Additionally there is defined a practical shape for the closing element of the pressure limiting valve, in order to direct pressure fluid, emerging radially from the throttle, toward the coaxial check valve.

A further embodiment defined herein reveals a structural unit comprising parts (housing, closing element, closing ball, springs and perforated plate) of the pressure limiting valve and check valve that are held together in such a way that they cannot fall out or be lost; the unit comprises a compact assembly and once the parts have been assembled, it can be checked and mounted in a housing rapidly and securely, for instance by a press fit.

Furthermore there is disclosed a means for coaxial guidance of the springs, in a space-saving arrangement, assures the undisturbed function of these springs.

The invention will be better understood and further objects and advantages thereof will become more apparent from the ensuing detailed description of preferred embodiments taken in conjunction with the drawings.

BRIEF DESCRIPTION OF THE DRAWINGS

FIG. 2 is a longitudinal section through a pressure limiting valve of the apparatus that is combined with a throttle, as a first exemplary embodiment of the invention;

FIG. 2a shows a modified embodiment of the throttle; and

FIG. 3 is a corresponding section through the pressure limiting valve of FIG. 2, expanded by a check valve, as a second exemplary embodiment.

DESCRIPTION OF THE PREFERRED EMBODIMENTS

Figure 1:
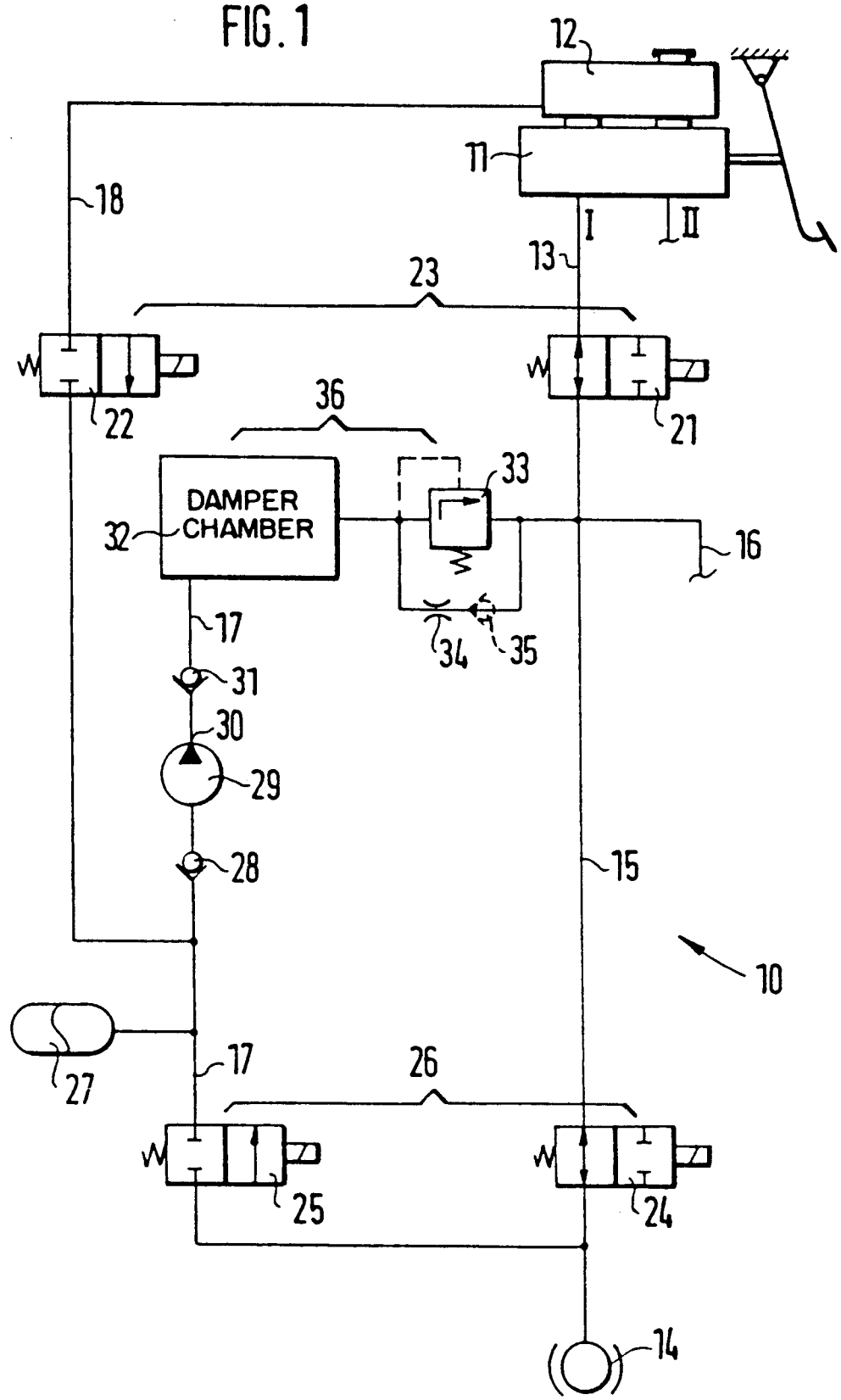
FIG. 1 is a diagram of a hydraulic vehicle brake system having an apparatus for damping pressure fluctuations.

The vehicle brake system 10 shown in FIG. 1 has a pedal-actuated master brake cylinder 11 with a supply container 12 for pressure fluid for generating brake pressure in brake circuits I and II. The brake circuit I has a master brake line 13, which is subdivided into brake lines 15 and 16 leading to wheel brakes 14. (Only one wheel brake 14 is shown in brake circuit I; similarly, because it is not essential to the disclosure of the invention, brake circuit II has not been shown here.) A feed line 17 is provided parallel to the brake line 15. An intake line 18 branches off from the feed line 17 and leads to the supply container 12 of the master brake cylinder 11.

A first 2/2-way valve 21 is disposed in the master brake line 13, and a second 2/2-way valve 22 is disposed in the intake line 18. The two multi-position valves 21 and 22 form a first pressure control valve assembly 23 for reducing drive slip, i.e., for traction control, at driven vehicle wheels. A third 2/2-way valve 24 is disposed in the brake line 15, and a fourth 2/2-way valve 25 is disposed in the feed line 17. These valves form a second pressure control valve assembly 26 for avoiding wheel lock, or skidding, during braking.

Viewed in the flow direction, a reservoir 27 for pressure fluid is connected to the feed line 17. A first check valve 28, a feed pump 29 for pressure fluid, and following its outlet 30 a second check valve 31 are incorporated in succession into the portion following the connection of the intake line 18 to the feed line 17. These are followed by a damper chamber 32 and a pressure limiting valve 33 having a throttle 34 connected parallel to them; a further check valve 35 may also be associated with this throttle. The damper chamber 32, the pressure limiting valve 33 and the throttle 34 form an apparatus 36 for damping pressure fluctuations engendered by the operation of the pump 29.

In normal braking operation, the multi-position valves 21, 22, 24 and 25 assume the positions shown: Brake pressure generated in the master brake cylinder 11 becomes operative in the wheel brake 14 (as well as in the other brakes of the two brake circuits I and II). The check valve 35 that is optionally associated with the throttle 34 prevents a buildup of brake pressure in this process in the damper chamber 32. If wheel locking threatens to occur during braking, then by means of an electronic control device, not shown, the multi-position valve 24 is switched into its blocking position, and the multi-position valve 25 is switched into its open position. The brake pressure in the wheel brake 14 can be reduced to an extent predetermined by the control device through the feed line 17 in the reservoir 27, by the reception of pressure fluid. At the same time, the pump 29 is switched on by the control device, and the pressure fluid is pumped through the damper chamber 32 and throttle 34 back to the master brake cylinder 11. In this process the apparatus 36 reduces the pressure fluctuations brought about by the pump 29.

If drive slip occurs at the driven wheel associated with the wheel brake 14, the control device switches the multi-position valve 22 to its open position and switches the multi-position valve 21 to its blocking position, while the multi-position valve 24 and 25 of the pressure control valve assembly 26 assume their basic positions shown. In this operating mode, the switched-on pump 29 pumps pressure fluid out of the supply container 12 through the intake line 18 and through the apparatus 36 located in the feed line 17 into the brake line 15, in order to generate brake pressure in the wheel brake 14. During the course of this operation the pressure limiting valve 33, which is set to a low differential pressure, opens and enables a rapid buildup of pressure in the wheel brake 14.

The apparatus 36 for damping pressure fluctuations part of which is shown in FIG. 2 has a housing 41 of a unit that receives the damper chamber 32, the pressure limiting valve 33 and the throttle 34. The throttle 34 and the pressure limiting valve 33 have a common sleevelike housing 42, which is press-fitted into a bore 43 of the unit housing 41. There is an inflow opening 45 for pressure fluid in the bottom 44 of the housing 42 oriented toward the damper chamber 32. On the opposite side, the housing 42 is closed off by a perforated plate 46 that is fastened in place by crimping and has an outflow opening 47. The feed line 17 continues on this side.

The housing 42 has a cylindrical inner bore 51, in which a closing element 52 of the pressure limiting valve 33 is embodied to fit and is guided in a longitudinally movable manner therein. The closing element 52 is provided with a hollow-cylindrical recess 53 that is open toward the perforated plate 46. A cylindrical helical compression spring 54 is guided in the recess 53, supported at one end against a bottom 55 axially defining the recess 53 and on the other against the perforated plate 46. An axially extending bore 56 originates at the bottom 55 of the closing element 52 and discharges into a transverse bore 57 that is disposed in a portion 58 of narrowed diameter of the closing element. On its face end, the closing element 52 is provided with a collar 59. The collar 59, which is supported on the housing bottom 44 by the action of the helical compression spring 54, fits over the inflow opening 45 of the housing 42. In the vicinity of the collar 59, the housing bottom 44 is embodied as a valve seat 60, the diameter of which is larger than that of the collar. The collar 59 and valve seat 60 form a closing valve. To form the throttle 34, the collar 59 of the closing element 52 is provided with an aperture 61 open toward the face end of the collar. The cross section of the aperture 61 may be defined triangularly, semicircularly, rectangularly, or the like. An aperture 61' can be located in the valve seat 60 of the housing bottom 44, as shown in FIG. 2a, instead of being located in the collar 59.

When pressure fluid is supplied during brake pressure regulation in anti-skid operation, it flows toward the inflow opening 45 in the bottom 44 of the housing 42 and passes through the aperture 60 of the throttle 34 into the inner bore 51 of the housing. The pressure fluid is carried through the transverse bore 57 and the axial bore 56 in the recess 53 of the closing element 52, which admits it through the outflow opening 47 in the perforated plate 46 into the feed line 17. If the throttle 34 is stopped up with particles, the pressure limiting valve 33, disposed to bypass the throttle, opens at a pressure that because of the initial stress of the helical compression spring 54 is higher, for instance by 30 bar, than the master cylinder pressure downstream of the pressure limiting valve 33. When the pressure limiting valve 33 has opened, the limitation, defined by the housing bottom, of the cross section of the aperture 61 is eliminated. The problematic particles can therefore be loosened and flushed out of the pressure limiting valve 33. The pressure limiting valve 33, which with the absence of flow resistance in the throttle 34 closes by spring force restores the proper function of the throttle.

When pressure fluid is pumped during traction control operation by the switched-on pump 29, the pressure limiting valve 33, which is set for differential pressure, opens, in the initial absence of counterpressure, and thus enables a rapid buildup of pressure in the wheel brake 14.

Unlike the above-described exemplary embodiment, in the exemplary embodiment of the apparatus 36' shown in FIG. 3 the check valve 35 is inserted into the closing element 52' of the pressure limiting valve 33. To this end, a valve seat 62 defining the axial bore 56' is formed in the bottom 55' of the closing element 52'. A closing ball 63 of the check valve 35 is associated with this valve seat 62. The closing ball 63 is prestressed against the valve seat 62 by means of a cylindrical helical compression spring 64 of small diameter. The helical compression spring 64 is longitudinally guided on a cylindrical mandrel 65 of the perforated plate 46', on which the helical compression spring is supported; the mandrel 65 extends coaxially with the longitudinal axis of the closing element 52'. The initial stress of the helical compression spring 64 is selected such that the check valve 35, located in line with the throttle 34, opens at a very much lower pressure than the pressure limiting valve 33.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus (36) for damping pressure fluctuations in a hydraulic vehicle brake system (10) comprising at least a single-circuit master brake cylinder (11) for generating brake pressure in at least one wheel brake (14), a pressure control valve assembly (26) between the master brake cylinder and the wheel brake, a pump (29) for drawing pressure fluid out of the wheel brake to avoid wheel locking during braking, wherein the pump is connected by its outlet (30) to the master brake cylinder, via a damper chamber (32) and a throttle (34) with a pressure limiting valve (33) having a spring-loaded, cylindrically embodied closing element (52) disposed to bypass the throttle, further in which the throttle (34) and the pressure limiting valve (33) have a common sleevelike housing (42) with a cylindrical interior and with an inflow opening (45) disposed on a housing bottom (44) of said housing (42), the cylindrically embodied closing element (52) is longitudinally movably guided in the housing (42) and on an end face of the housing (42) has a hollow collar (59) fitting over the inflow opening (45) and supported on the housing bottom (44), the collar (59) forms a closing valve with the housing bottom (44), and the collar (59) of the closing element (52) and a valve seat (60) of the housing bottom (44) forms the throttle (34), with at least one aperture (61, 61') open toward an end face of the collar.

2. An apparatus as defined by claim 1, in which a check valve (35) located in line with the throttle (34) is disposed between the damper chamber (32) and the master brake cylinder (11).

3. An apparatus as defined by claim 2, in which the closing element (52') is provided on its side remote from the collar (59), with a hollow-cylindrical recess (53), on a bottom (55') of which a second valve seat (62) communicating with the throttle (34) is disposed, the second valve seat being engaged by a spring-loaded closing ball (63) of the check valve (35).

4. An apparatus as defined by claim 2, in which an axially extending bore (56') begins at a second valve seat (62) of the closing element (52') and discharges into a transverse bore (57), which is disposed in a portion (58) of a narrowed diameter of the closing element (52').

5. An apparatus as defined by claim 1, in which the housing (42) is closed on its side remote from the inflow opening (45), with a perforated plate (46) on which a spring (54) of said pressure limiting valve (33) is supported.

6. An apparatus as defined by claim 2, in which the housing (42) is closed on its side remote from the inflow opening (45), with a perforated plate (46) on which a spring (54) of said pressure limiting valve (33) is supported.

7. An apparatus as defined by claim 3, in which the housing (42) is closed on its side remote from the inflow opening (45), with a perforated plate (46) on which a spring (54) of said pressure limiting valve (33) is supported.

8. An apparatus as defined by claim 4, in which the housing (42) is closed on its side remote from the inflow opening (45), with a perforated plate (46) on which a spring (54) of said pressure limiting valve (33) is supported.

9. An apparatus as defined by claim 1, in which a spring, embodied as a cylindrical helical compression spring (54), of the pressure limiting valve (33) is longitudinally guided in a hollow-cylindrical recess (53) of the closing element (52), and a cylindrical helical compression spring (64) of a check valve (35) is longitudinally guided on a cylindrical mandrel (65) of a perforated plate (46'), said mandrel extending coaxially with the closing element.

10. An apparatus as defined by claim 2, in which a spring, embodied as a cylindrical helical compression spring (54), of the pressure limiting valve (33) is longitudinally guided in a hollow-cylindrical recess (53) of the closing element (52), and a cylindrical helical compression spring (64) of the check valve (35) is longitudinally guided on a cylindrical mandrel (65) of a perforated plate (46'), said mandrel extending coaxially with the closing element.

11. An apparatus as defined by claim 3, in which a spring, embodied as a cylindrical helical compression spring (54), of the pressure limiting valve (33) is longitudinally guided in the hollow-cylindrical recess (53) of the closing element (52), and a cylindrical helical compression spring (64) of the check valve (35) is longitudinally guided on a cylindrical mandrel (65) of a perforated plate (46'), said mandrel extending coaxially with the closing element.

12. An apparatus as defined by claim 4, in which a spring, embodied as a cylindrical helical compression spring (54), of the pressure limiting valve (33) is longitudinally guided in a hollow-cylindrical recess (53) of the closing element (52), and a cylindrical helical compression spring (64) of the check valve (35) is longitudinally guided on a cylindrical mandrel (65) of a perforated plate (46'), said mandrel extending coaxially with the closing element.

13. An apparatus as defined by claim 5, in which the spring, embodied as a cylindrical helical compression spring (54), of the pressure limiting valve (33) is longitudinally guided in a hollow-cylindrical recess (53) of the closing element (52), and a cylindrical helical compression spring (64) of a check valve (35) is longitudinally guided on a cylindrical mandrel (65) of the perforated plate (46'), said mandrel extending coaxially with the closing element.

14. An apparatus as defined by claim 6, in which the spring, embodied as a cylindrical helical compression spring (54), of the pressure limiting valve (33) is longitudinally guided in a hollow-cylindrical recess (53) of the closing element (52), and a cylindrical helical compression spring (64) of the check valve (35) is longitudinally guided on a cylindrical mandrel (65) of the perforated plate (46'), said mandrel extending coaxially with the closing element.

15. An apparatus (36) for damping pressure fluctuations in a hydraulic vehicle brake system (10) comprising at least a single-circuit master brake cylinder (11) for generating brake pressure in at least one wheel brake (14), a pressure control valve assembly (26) between the master brake cylinder and the wheel brake, a pump (29) for drawing pressure fluid out of the wheel brake to avoid wheel locking during braking, wherein the pump is connected by its outlet (30) to the master brake cylinder, via a damper chamber (32) and a throttle (34) with a pressure limiting valve (33) having a spring-loaded, cylindrically embodied closing element (52) disposed to bypass the throttle, further in which the throttle (34) and the pressure limiting valve (33) have a common sleevelike housing (42) with a cylindrical interior and with an inflow opening (45) disposed on a housing bottom (44) of said housing (42), the cylindrically embodied closing element (52) is longitudinally movably guided in the housing (42) and on an end face of the housing (42) has a hollow collar (59) fitting over the inflow opening (45) and supported on the housing bottom (44), the collar (59) forms a closing valve with the housing bottom (44), and a valve seat (60) of the housing bottom (44) forms the throttle (34), with at least one aperture (61, 61') open toward an end face of the collar.

16. An apparatus as defined by claim 15, in which a check valve (35) located in line with the throttle (34) is disposed between the damper chamber (32) and the master brake cylinder (11).

17. An apparatus as defined by claim 16, in which the closing element (52') is provided on its side remote from the collar (59), with a hollow-cylindrical recess (53), on a bottom (55') of which a second valve seat (62) communicating with the throttle (34) is disposed, the second valve seat being engaged by a spring-loaded closing ball (63) of the check valve (35).

18. An apparatus as defined by claim 16, in which an axially extending bore (56') begins at a second valve seat (62) of the closing element (52') and discharges into a transverse bore (57), which is disposed in a portion (58) of a narrowed diameter of the closing element (52').

19. An apparatus as defined by claim 15, in which the housing (42) is closed on its side remote from the inflow opening (45), with a perforated plate (46) on which a spring (54) of said pressure limiting valve (33) is supported.

20. An apparatus as defined by claim 16, in which the housing (42) is closed on its side remote from the inflow opening (45), with a perforated plate (46) on which a spring (54) of said pressure limiting valve (33) is supported.

21. An apparatus as defined by claim 17, in which the housing (42) is closed on its side remote from the inflow opening (45), with a perforated plate (46) on which a spring (54) of said pressure limiting valve (33) is supported.

22. An apparatus as defined by claim 18, in which the housing (42) is closed on its side remote from the inflow opening (45), with a perforated plate (46) on which a spring (54) of said pressure limiting valve (33) is supported.

23. An apparatus as defined by claim 15, in which a spring, embodied as a cylindrical helical compression spring (54), of the pressure limiting valve (33) is longitudinally guided in a hollow-cylindrical recess (53) of the closing element (52), and a cylindrical helical compression spring (64) of a check valve (35) is longitudinally guided on a cylindrical mandrel (65) of a perforated plate (46'), said mandrel extending coaxially with the closing element.

24. An apparatus as defined by claim 16, in which a spring, embodied as a cylindrical helical compression spring (54), of the pressure limiting valve (33) is longitudinally guided in a hollow-cylindrical recess (53) of the closing element (52), and a cylindrical helical compression spring (64) of the check valve (35) is longitudinally guided on a cylindrical mandrel (65) of a perforated plate (46'), said mandrel extending coaxially with the closing element.

25. An apparatus as defined by claim 17, in which a spring, embodied as a cylindrical helical compression spring (54), of the pressure limiting valve (33) is longitudinally guided in the hollow-cylindrical recess (53) of the closing element (52), and a cylindrical helical compression spring (64) of the check valve (35) is longitudinally guided on a cylindrical mandrel (65) of a perforated plate (46'), said mandrel extending coaxially with the closing element.

26. An apparatus as defined by claim 18, in which a spring, embodied as a cylindrical helical compression spring (54), of the pressure limiting valve (33) is longitudinally guided in a hollow-cylindrical recess (53) of the closing element (52), and a cylindrical helical compression spring (64) of the check valve (35) is longitudinally guided on a cylindrical mandrel (65) of a perforated plate (46'), said mandrel extending coaxially with the closing element.

27. An apparatus as defined by claim 19, in which the spring, embodied as a cylindrical helical compression spring (54), of the pressure limiting valve (33) is longitudinally guided in a hollow-cylindrical recess (53) of the closing element (52), and a cylindrical helical compression spring (64) of a check valve (35) is longitudinally guided on a cylindrical mandrel (65) of the perforated plate (46'), said mandrel extending coaxially with the closing element.

28. An apparatus as defined by claim 20, in which the spring, embodied as a cylindrical helical compression spring (54), of the pressure limiting valve (33) is longitudinally guided in a hollow-cylindrical recess (53) of the closing element (52), and a cylindrical helical compression spring (64) of the check valve (35) is longitudinally guided on a cylindrical mandrel (65) of the perforated plate (46'), said mandrel extending coaxially with the closing element.

29. An apparatus (36) for damping pressure fluctuations in a hydraulic vehicle brake system (10) comprising at least a single-circuit master brake cylinder (11) for generating brake pressure in at least one wheel brake (14), a pressure control valve assembly (26) between the master brake cylinder and the wheel brake, a pump (29) for drawing pressure fluid out of the wheel brake to avoid wheel locking during braking, wherein the pump is connected by its outlet (30) to the master brake cylinder, via a damper chamber (32) and a throttle (34) with a pressure limiting valve (33) having a spring-loaded, cylindrically embodied closing element (52) disposed to bypass the throttle, further in which the throttle (34) and the pressure limiting valve (33) have a common sleevelike housing (42) with a cylindrical interior and with an inflow opening (45) disposed on a housing bottom (44) of said housing (42), the cylindrically embodied closing element (52) is longitudinally movably guided in the housing (42) and on an end face of the housing (42) has a hollow collar (59) fitting over the inflow opening (45) and supported on the housing bottom (44), the collar (59) forms a closing valve with the housing bottom (44), and the collar (59) of the closing element (52) forms the throttle (34), with at least one aperture (61) open toward an end face of the collar.

30. An apparatus as defined by claim 29, in which a check valve (35) located in line with the throttle (34) is disposed between the damper chamber (32) and the master brake cylinder (11).

31. An apparatus as defined by claim 30, in which the closing element (52') is provided on its side remote from the collar (59), with a hollow-cylindrical recess (53), on a bottom (55') of which a valve seat (62) communicating with the throttle (34) is disposed, the valve seat being engaged by a spring-loaded closing ball (63) of the check valve (35).

32. An apparatus as defined by claim 30, in which an axially extending bore (56') begins at a valve seat (62) of the closing element (52') and discharges into a transverse bore (57), which is disposed in a portion (58) of a narrowed diameter of the closing element (52').

33. An apparatus as defined by claim 29, in which the housing (42) is closed on its side remote from the inflow opening (45), with a perforated plate (46) on which a spring (54) of said pressure limiting valve (33) is supported.

34. An apparatus as defined by claim 30, in which the housing (42) is closed on its side remote from the inflow opening (45), with a perforated plate (46) on which a spring (54) of said pressure limiting valve (33) is supported.

35. An apparatus as defined by claim 31, in which the housing (42) is closed on its side remote from the inflow opening (45), with a perforated plate (46) on which a spring (54) of said pressure limiting valve (33) is supported.

36. An apparatus as defined by claim 32, in which the housing (42) is closed on its side remote from the inflow opening (45), with a perforated plate (46) on which a spring (54) of said pressure limiting valve (33) is supported.

37. An apparatus as defined by claim 29, in which a spring, embodied as a cylindrical helical compression spring (54), of the pressure limiting valve (33) is longitudinally guided in a hollow-cylindrical recess (53) of the closing element (52), and a cylindrical helical compression spring (64) of a check valve (35) is longitudinally guided on a cylindrical mandrel (65) of a perforated plate (46'), said mandrel extending coaxially with the closing element.

38. An apparatus as defined by claim 30, in which a spring, embodied as a cylindrical helical compression spring (54), of the pressure limiting valve (33) is longitudinally guided in a hollow-cylindrical recess (53) of the closing element (52), and a cylindrical helical compression spring (64) of the check valve (35) is longitudinally guided on a cylindrical mandrel (65) of a perforated plate (46'), said mandrel extending coaxially with the closing element.

39. An apparatus as defined by claim 31, in which a spring, embodied as a cylindrical helical compression spring (54), of the pressure limiting valve (33) is longitudinally guided in the hollow-cylindrical recess (53) of the closing element (52), and a cylindrical helical compression spring (64) of the check valve (35) is longitudinally guided on a cylindrical mandrel (65) of a perforated plate (46'), said mandrel extending coaxially with the closing element.

40. An apparatus as defined by claim 32, in which a spring, embodied as a cylindrical helical compression spring (54), of the pressure limiting valve (33) is longitudinally guided in a hollow-cylindrical recess (53) of the closing element (52), and a cylindrical helical compression spring (64) of the check valve (35) is longitudinally guided on a cylindrical mandrel (65) of a perforated plate (46'), said mandrel extending coaxially with the closing element.

41. An apparatus as defined by claim 33, in which the spring, embodied as a cylindrical helical compression spring (54), of the pressure limiting valve (33) is longitudinally guided in a hollow-cylindrical recess (53) of the closing element (52), and a cylindrical helical compression spring (64) of a check valve (35) is longitudinally guided on a cylindrical mandrel (65) of the perforated plate (46'), said mandrel extending coaxially with the closing element.

42. An apparatus as defined by claim 34, in which the spring, embodied as a cylindrical helical compression spring (54), of the pressure limiting valve (33) is longitudinally guided in a hollow-cylindrical recess (53) of the closing element (52), and a cylindrical helical compression spring (64) of the check valve (35) is longitudinally guided on a cylindrical mandrel (65) of the perforated plate (46'), said mandrel extending coaxially with the closing element.

* * * * *